UNITED STATES PATENT OFFICE

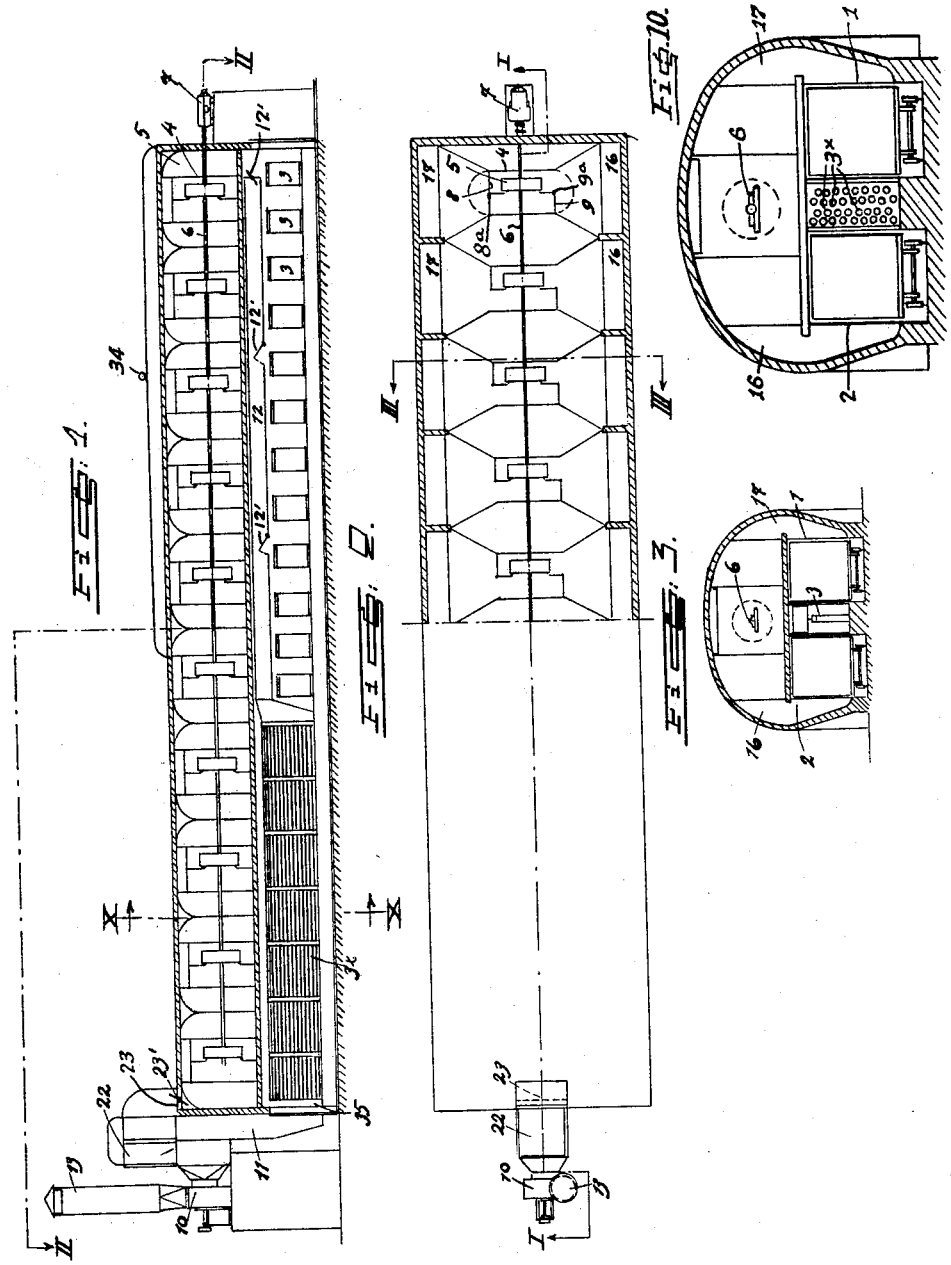

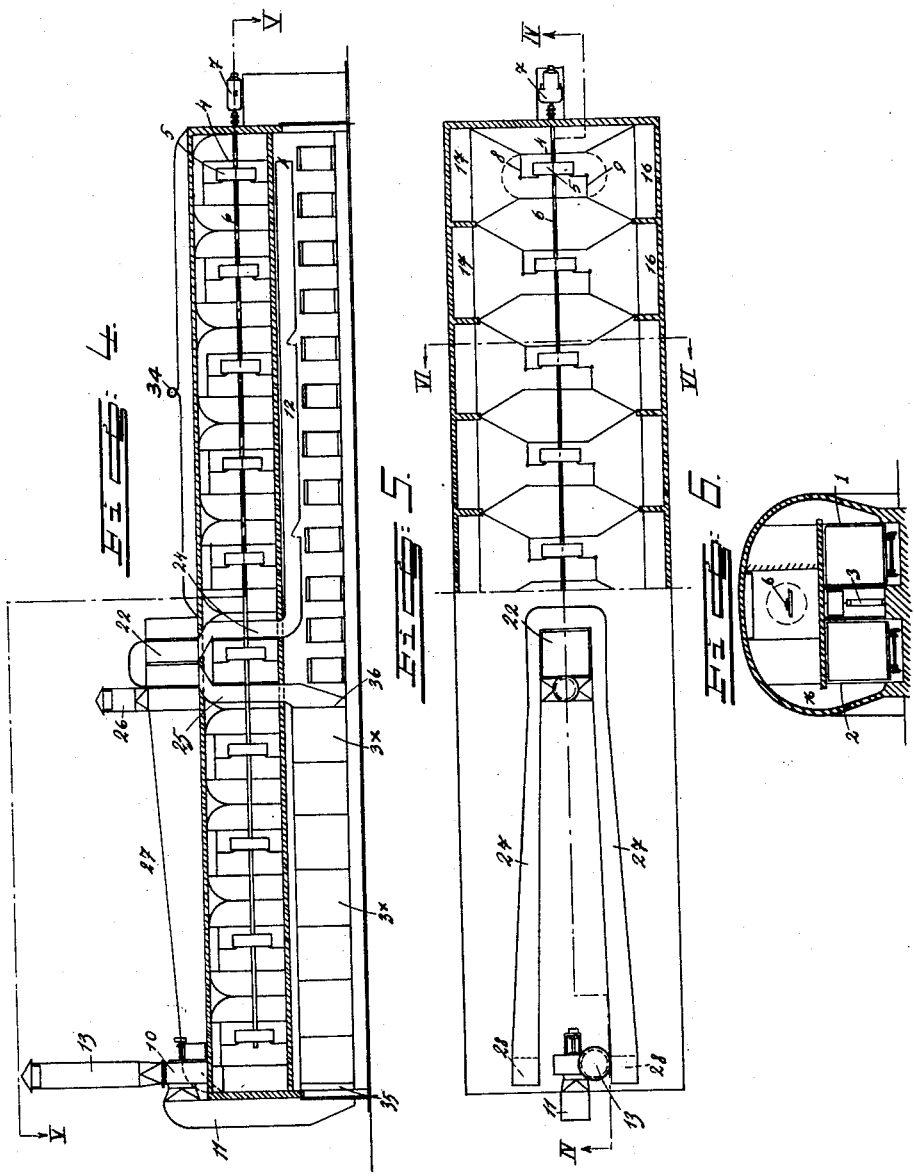

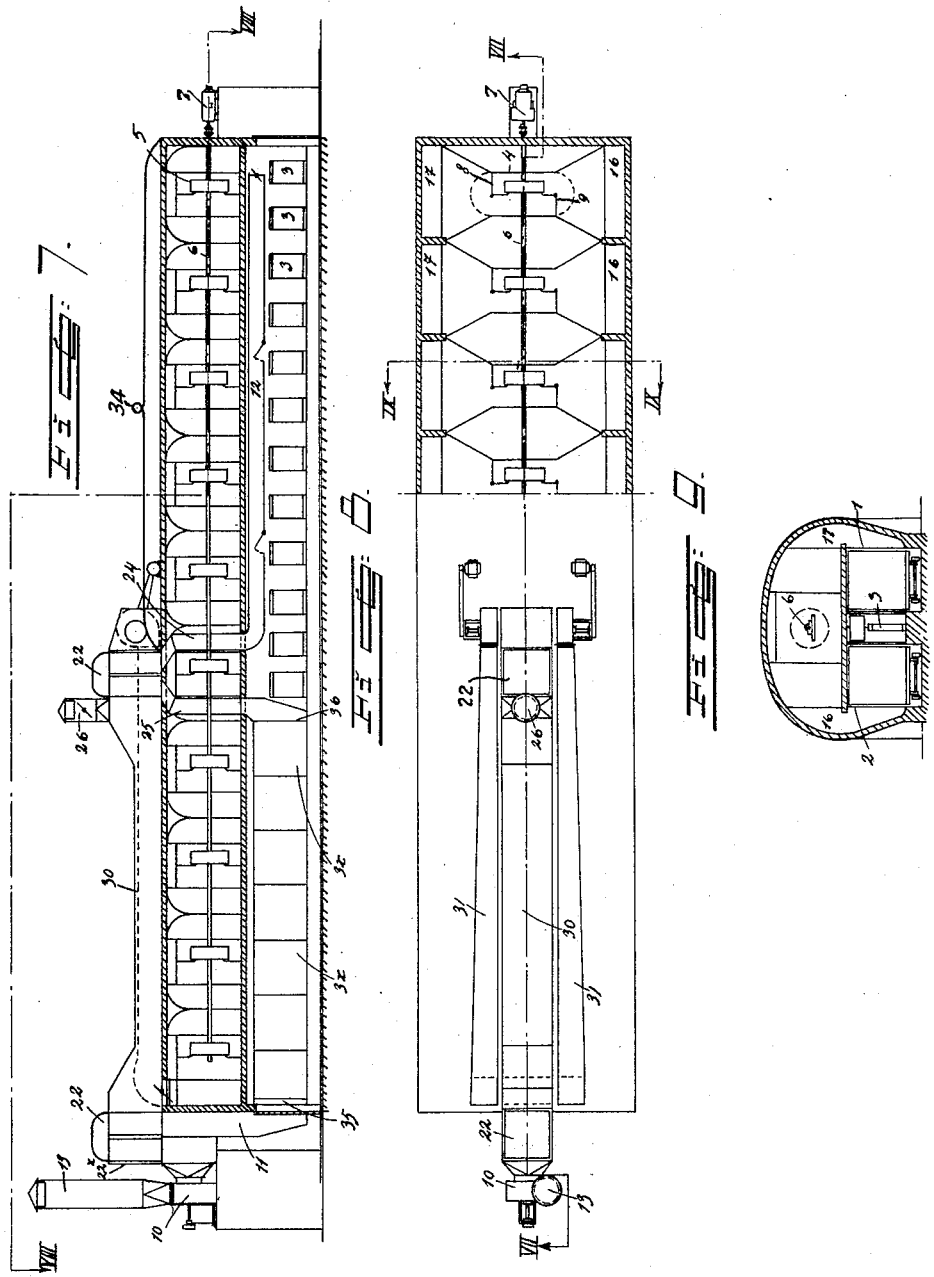

JOHAN GUSTAF OLSSON, OF LIDINGON, AND FRANS IVAR EUGÉN STENFORS, OF ALSTEN, SWEDEN, ASSIGNORS TO AKTIEBOLAGET SVENSKA FLÄKTFABRIKEN, OF STOCKHOLM, SWEDEN

DRYING DEVICE FOR WOOD, BRICK, POTTERY, ETC., PROVIDED WITH HEAT RECOVERING DEVICES

Application filed May 1, 1930, Serial No. 448,971, and in Sweden May 7, 1929.

Tunnel drying ovens are known in which the drying air driven by a number of ventilators circulates in planes which are substantially at right angles to the longitudinal direction of the tunnel. It is also known to recover the heat of the moist air discharged by letting it pass through heat exchanging tubes located within the drying oven, which tubes at one end are connected to the warmer portion of the oven and at the other end to the atmosphere. Thus, the heat exchanging tubes extend in the longitudinal direction of the oven and are swept by the drying air circulating in the transverse direction. By such an arrangement the moist air can be cooled so effectively that part of the water vapors accompanying the air is condensed in the heat exchanging tubes. The more the moist air can be cooled, the better the heat economy will be. In order to obtain greater cooling, the temperature of the cooler portion of the oven must be still more reduced. This results, however, in reducing the evaporating power in this portion of the oven which in turn requires the enlargement of the oven. An effective utilization of the escaping heat by cooling the moist air in the heat exchanging tubes, located within the oven, thus results in a relatively high initial cost.

Many years ago, in drying devices of different kinds, provision was made for a simple recovery of heat consisting in passing the moist exhaust air through a heat exchange device, permitting it to give off heat to the ingoing fresh air. The heat recovery by such a system is, however, very limited especially in drying devices working at comparatively high temperature. If the air leaving the drying device is relatively warm, it may carry with it large quantities of water vapors, and therefore the air quantity then becomes smaller relatively to the quantity of water vapor. The same quantity of air which leaves the drying device must be supplied in the form of fresh air to the drying device, but as, owing to the above-mentioned reasons, the quantity of air is relatively small, the quantity of heat which in this way can be brought back to the drying device also becomes insignificant.

From the above discussion it is clear that both systems for recovering heat have their very special limitations. The present invention relates to a combination of these known devices for recovering heat. By permitting the moist air to pass through the heat exchanging tubes located within the oven as well as the heat exchange element located outside the oven, a new and good technical effect is achieved. When the drying device has been extended to a certain degree, and a further extension would appear disadvantageous from an economic point of view, the heat economy may by means of the above-mentioned combination be still further improved and the capacity of the oven be increased. The temperature of the colder portion of the oven need not be lowered to such an extent in order to obtain good heat economy that the intensity of the drying is reduced too much. Further, the final cooling of the moist air may take place in a cheaper and better way by the ingoing fresh air as the latter always has a lower temperature than the circulating air in the cooler portion of the oven.

In combining the above-mentioned heat recovery devices other alternative arrangements may be employed without departing from the scope of the invention. Thus, the heat exchange element located outside the oven may, in the way mentioned above, be connected to the outlet end of the heat exchanging tubes located in the tunnel so that the moist air which comes from the oven first passes the heating tubes in the oven and then the heat exchange element.

It is also advantageous from many points of view, to let the moist air coming from the oven first pass a heat exchange element located outside the drying device and then pass the heating tubes located in the tunnel. The advantages of such an arrangement are that the temperature difference between the two mediums which are to exchange heat becomes great and, thus, the necessary heating surface becomes small. This is the more important as the coefficients of heat transmission at the beginning before condensation has yet taken place in the moist air canals are relatively small. Thus, it is the question of cooling the moist exhaust air quickly and in the cheapest way down to the due point, and this is preferably effected by cooling with fresh air. The heating having thus been brought to saturation, it is introduced into the heat tubes located within the oven, where additional cooling takes place. In such a case the coefficient of heat transmission between the moist air and the metal wall of the heat tubes is very great, and the heat surface thus becomes relatively small. It is only necessary to increase the external surface of the heating tubes by means of flanges, ribs or the like in order to compensate for the effect of the worse heat transfer conditions prevalent on the exterior.

A third alternative also involves great advantages, namely the combination of two heat exchange elements located outside the oven and of heating tubes located within the oven. The moist air will thus first pass from the warmest portion of the oven through a heat exchange element located outside the oven, then through the heating tubes located within the oven and finally an additional heat exchange element located outside the oven. The fresh air may here pass the elements located outside the drying device in series, preferably in such a way that it first passes the element located at the exit end of the heat tubes and then the element at the intake end. The fresh air thus heated may be supplied to the oven at one or more places, for instance at that portion of the oven located near the outlet end of the heating tubes. The fresh air may also be conducted in two separate streams each through its separate heat exchange element and then supplied to the oven in a suitable way.

Three embodiments of the invention are shown in the accompanying drawings. Figs. 1, 2 and 3 show a vertical longitudinal section, a part horizontal section and plan view and a vertical cross section of an embodiment respectively. The sections are taken along the lines I—I of Fig. 2, II—II of Fig. 1 and III—III of Fig. 2. Figs. 4, 5 and 6 show, in the same manner, a second embodiment, where the section shown in Fig. 4 is taken along the line IV—IV of Fig. 5, the one in Fig. 5 along the line V—V of Fig. 4 and the one in Fig. 6 along the line VI—VI of Fig. 5. Figs. 7, 8 and 9 finally show, in the same manner, the third embodiment, the three sections being taken respectively along the line VII—VII of Fig. 8, VIII—VIII of Fig. 7 and IX—IX of Fig. 8, and Fig. 10 is a section on line X—X of Fig. 1.

In all the three embodiments the material to be dried is placed on trucks passing from left to right on tracks as at 1 and 2. The circulating air current is heated by means of heat batteries 3. The heat tubes 3x from said batteries are connected to the warmest portion 34 of the plant. Fan runners 5 are located in fan houses having inlets 4 and mounted on a shaft 6 which is connected with the driving motor 7. The moist air is exhausted from the drying chamber by means of a fan 10 connected to the drying chamber through conduits 11, 12 and to the atmosphere through a conduit 13. The drying air enters through intakes which will be described below. Numerals 8 and 9 indicate reversing dampers.

The portion described of the plant works in the following manner: When the motor and the fan are running, the air is driven in the position of the reversing dampers 8, 9, see right end of Fig. 2 through the passages 16, to the drying track 2. The air having passed through the material to be dried in this track, it passes while contacting with the heat batteries 3 to the drying track 1, traverses the material to be dried in this track and returns through drums 17 to the fan houses 4.

While the circulation continues in this manner, the material to be dried in track 1 is subjected to air having a higher drying capacity than the material in track 2. When this has continued for a while, the dampers 8—9 are turned 180°. The air current now reverses its direction across the tracks. Thus, the material to be dried in track 2 will now be subjected to air having a higher drying capacity than the material in track 1. If the dampers are reversed at equal intervals, the material to be dried in track 1 will be dried as rapidly as the material in track 2, and vice versa.

At the cooler part of the oven the heating elements 3 are replaced by heating tubes $3x$ deriving their heat from the air passing from the part 34 of the oven by the duct 12.

Thus fresh air is admitted through heat exchange elements 22 where it is pre-heated and enters the left-hand end of the oven, which is the end at which the goods to be dried are charged. It is then circulated spirally over the goods, receiving at each stage an accession of heat from the heating tubes $3x$. At about the center of the length of the oven (in the particular embodiments shown) the heating tubes $3x$ cease and their place is taken by live heaters 3 imparting a higher degree of heat. The air continues in a similar way to the right-hand end, though a part of it may be tapped off intermediately by the valves 12' shown. It is now fully charged with moisture, having come in contact with the goods along the whole length of the oven up to the right-hand outlet end. The hot moist air then passes from the duct 12 through heating tubes $3x$ where it yields up heat to the air at the left hand end of the oven.

The description to this point is common to all three embodiments. The difference between them lies in the disposition of the heat exchange elements 22 and $22^a$ and their connections in the air circulation. This part of the apparatus will now be described separately for the three examples shown.

According to Figs. 1 to 3 the heat exchange element 22 is located at the outlet end 35 of the heating tubes 3x placed in the drying tracks in such a way that the moist air passes through it on its way from the conduit 11 to the stack 13. The fresh air passing through the element 22 arrives at the drying device through an intake 23 having a regulator 23.

In the embodiment according to Figs. 4 to 6 a heat exchange element 22a, is connected to the inlet end 36 of the heating tubes 3x located in the drying tracks, the said element being connected by means of a conduit 24 to the moist air conduit 12 and by another conduit 25 to the heating tubes 3x. The fresh air passages of the element 22a, are connected at the one end by a stack 26 to the atmosphere and at the other end by conduits 27 to the fresh air intakes 28 to the oven located, as shown, in the vicinity of the outlet end of the heat tubes 3x.

In the embodiment according to Figs. 7, 9 one element 22a is connected to the inlet end 36 of the heating tubes 3x and a second similar element 22 to the outlet end 35 of the same tubes so that the moist air coming from the oven, i. e. through the duct 12, first passes one heat exchange element 22a, then the heating tubes 3x and finally the other heat exchange element 22 as at the embodiment shown in Figs. 1 to 3. Said element 22 located at the outlet end 35 of the heat tubes has its fresh air passage connected to the atmosphere by means of an intake at 22x and to the fresh air inlet of the other element 22a by means of a conduit 30. The latter fresh air element has an extra fresh air inlet at 26, and its outlet is connected by means of conduits 31 to that portion of the oven lying in the vicinity of the outlet end 35 of the heat tubes 3x. It remains to be mentioned that the fresh air passages of the heat exchange elements may be separately connected, on the one hand, to the atmosphere, and, on the other hand, to the oven.

Having now described our invention, what we claim as new and desire to secure by Letters Patent is:

1. Drying device of the class described, consisting of a canal through which the material to be dried is to pass through heat exchange tubes and heat exchange elements respectively located along this canal, ventilators adapted to pass a drying medium along said heat exchange tubes and to return the medium back to the heat tubes again, the heat tubes being located along the canal, said tubes being at their one end connected to the warmest portion of the drying device and at the other end connected to the atmosphere, said heat exchange element being located outside the drying device permitting the wet air coming from the warmest portion of the drying device to pass through the heat tubes located in the drying device as well as the exchange element whereby the wet air flows through the one canal system in this element and the fresh air supplied to the drying device flows through the other canal system; the said heat exchange elements being connected to the inlet end of the heat tubes located in the drying canal whereby the wet air coming from the drying device is first directed past the heat exchange element and then the heat tubes in the drying device.

2. Drying device of the class described, consisting of a canal through which the material to be dried is to pass through heat exchange tubes and heat exchange elements respectively located along this canal, ventilators adapted to pass a drying medium along said heat exchange tubes and to return the medium back to the heat tubes again, the heat tubes being located along the canal, said tubes being at their one end connected to the warmest portion of the drying device and at the other end connected to the atmosphere, said heat exchange element being located outside the drying device permitting the wet air coming from the warmest portion of the drying device to pass through the heat tubes located in the drying device as well as the exchange element whereby the wet air flows through the one canal system in this element and the fresh air supplied to the drying device flows through the other canal system; one of said heat exchange elements being connected to the inlet end of the heat tubes located in the drying canal and a second heat exchange element connected to the outlet end for the same heat tubes whereby the wet air coming from the drying device is first directed past one heat exchange element, then past the heat tubes in the drying device and finally past a second heat exchange element.

3. Drying device of the class described including a canal for the material to be dried, heat supplying means at one part of the canal, heat exchange tubes at another part of the same and an air-preheater placed independently of the canal, air propelling means adapted to drive drying air repeatedly into contact with the tubes and with the heat supplying means, said tubes and air-preheater being connected in series to each other and to the warmest part of the canal to lead off moist air from the canal, whereby the tubes transfer heat from said moist air to the contacting air, said air-preheater being connected to the tubes with one canal system and to the drying canal with another canal system and being adapted to transfer heat from the moist air exhausted from the canal, to the fresh air to be supplied to the canal.

4. Device according to claim 3, in which the air-preheater is connected to the outlet end of the heat exchange tubes and said tubes with the inlet ends connected to the warmest part of the canal, whereby the moist air coming from the drying device is first directed through the heat tubes and then through the air-preheater.

5. Device according to claim 3, in which the air-preheater is connected to the inlet ends of the heat tubes located in the drying canal, whereby the moist air coming from the drying device is first directed through the air-preheater and then through the heat exchange tubes in the drying device.

6. Device according to claim 3, in which one air-preheater is connected to the inlet ends of the heat exchange tubes and the second air-preheater connected to the outlet ends for the same heat exchange tubes, whereby the moist air coming from the drying device is first directed through one air-preheater, then through the heat exchange tubes and finally through a second air-preheater.

In witness whereof we have hereunto signed our names.

JOHAN GUSTAF OLSSON.
FRANS IVAR EUGÉN STENFORS.